(12) United States Patent
Matsui et al.

(10) Patent No.: US 12,111,522 B2
(45) Date of Patent: Oct. 8, 2024

(54) ISOLATOR, LIGHT SOURCE APPARATUS, OPTICAL TRANSCEIVER, OPTICAL SWITCH, OPTICAL AMPLIFIER, AND DATA CENTER

(71) Applicant: KYOCERA Corporation, Kyoto (JP)

(72) Inventors: Naoki Matsui, Tokyo (JP); Hiromichi Yoshikawa, Yokohama (JP); Tomoya Sugita, Machida (JP)

(73) Assignee: KYOCERA Corporation, Kyoto (JP)

( * ) Notice: Subject to any disclaimer, the term of this patent is extended or adjusted under 35 U.S.C. 154(b) by 606 days.

(21) Appl. No.: 17/296,418

(22) PCT Filed: Nov. 1, 2019

(86) PCT No.: PCT/JP2019/043137
§ 371 (c)(1),
(2) Date: May 24, 2021

(87) PCT Pub. No.: WO2020/110612
PCT Pub. Date: Jun. 4, 2020

(65) Prior Publication Data
US 2022/0026748 A1 Jan. 27, 2022

(30) Foreign Application Priority Data
Nov. 28, 2018 (JP) .................. 2018-222905

(51) Int. Cl.
*G02F 1/095* (2006.01)
*G02B 6/125* (2006.01)
(Continued)

(52) U.S. Cl.
CPC ............ *G02F 1/0955* (2013.01); *G02B 6/125* (2013.01); *G02B 6/2746* (2013.01); *G02B 6/29338* (2013.01); *H04B 10/40* (2013.01)

(58) Field of Classification Search
CPC ..... G02F 1/0955; H04B 10/40; G02B 6/2746; G02B 6/29338; G02B 6/125; G02B 6/126; G02B 2006/12157; G02B 27/281
See application file for complete search history.

(56) References Cited

U.S. PATENT DOCUMENTS 6,501,551 B1 * 12/2002 Tearney ............. G01B 9/02091
356/477
7,215,848 B2 5/2007 Tan et al.
(Continued)

FOREIGN PATENT DOCUMENTS

JP H03-10212 A 1/1991
JP H06-51241 A 2/1994
(Continued)

*Primary Examiner* — Michael P Mooney
(74) *Attorney, Agent, or Firm* — Studebaker & Brackett PC

(57) ABSTRACT

An isolator includes a first waveguide with a linear shape and a second waveguide with an annular shape on a substrate including a substrate surface, the first waveguide being positioned along the substrate surface. The first waveguide and the second waveguide each include a core and a cladding. The first waveguide includes a first end, a second end, and a port at each of the first end and the second end for input and output of electromagnetic waves. The core of the second waveguide includes a non-reciprocal member in at least a portion of a cross-section intersecting a direction in which the second waveguide extends.

20 Claims, 11 Drawing Sheets

(51) Int. Cl.
G02B 6/27 (2006.01)
G02B 6/293 (2006.01)
H04B 10/40 (2013.01)

(56) References Cited

U.S. PATENT DOCUMENTS

| | | | |
|---|---|---|---|
| 2001/0048643 A1* | 12/2001 | Inoue | G11B 11/10515 |
| | | | 369/13.01 |
| 2006/0103380 A1* | 5/2006 | Kochergin | G01R 33/0322 |
| | | | 324/244.1 |
| 2008/0266644 A1 | 10/2008 | Sigalas et al. | |
| 2012/0236389 A1 | 9/2012 | Montoya et al. | |
| 2013/0039618 A1* | 2/2013 | Kimerling | G02B 6/12007 |
| | | | 385/32 |
| 2016/0109736 A1 | 4/2016 | Bahl et al. | |
| 2016/0341981 A1 | 11/2016 | Carroll et al. | |
| 2017/0307375 A1 | 10/2017 | Bowers et al. | |

FOREIGN PATENT DOCUMENTS

| | | |
|---|---|---|
| JP | H07-64023 A | 3/1995 |
| JP | H07-234381 A | 9/1995 |
| JP | H11-30766 A | 2/1999 |
| JP | 2003-302603 A | 10/2003 |
| JP | 3457711 B2 | 10/2003 |
| JP | 2005-215674 A | 8/2005 |
| JP | 2009-204984 A | 9/2009 |
| WO | 2012125368 A1 | 9/2012 |
| WO | 2017/136459 A1 | 8/2017 |

\* cited by examiner

FIG. 7
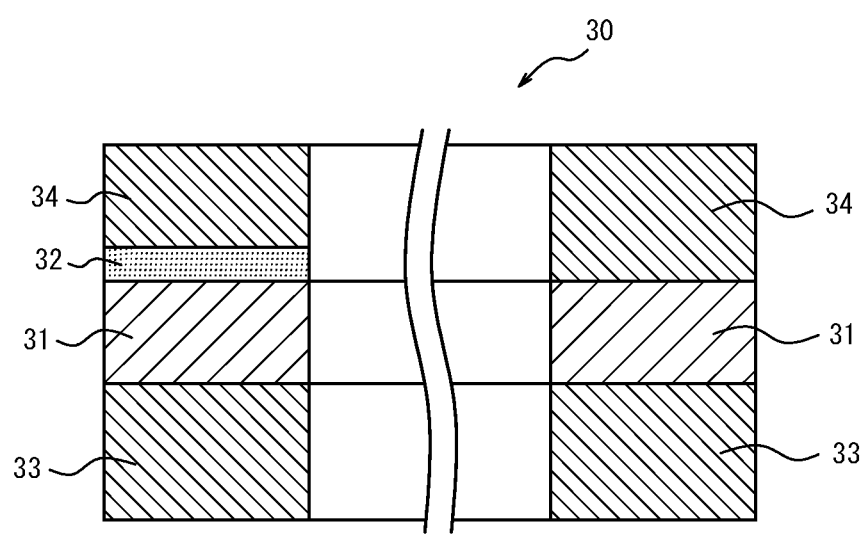
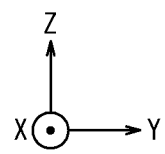

ISOLATOR, LIGHT SOURCE APPARATUS, OPTICAL TRANSCEIVER, OPTICAL SWITCH, OPTICAL AMPLIFIER, AND DATA CENTER

CROSS-REFERENCE TO RELATED APPLICATION

The present application claims priority to Japanese Patent Application No. 2018-222905 filed on Nov. 28, 2018, the entire contents of which are incorporated herein by reference.

TECHNICAL FIELD

The present disclosure relates to an isolator, a light source apparatus, an optical transceiver, an optical switch, an optical amplifier, and a data center.

BACKGROUND

In a known configuration, an isolator whose transmittance differs depending on the propagation direction of electromagnetic waves includes a non-reciprocal phase device. For example, see patent literature (PTL) 1.

CITATION LIST

Patent Literature

PTL 1: JP 2003-302603 A

SUMMARY

An isolator according to an embodiment of the present disclosure includes a first waveguide with a linear shape positioned on a substrate surface of a substrate, and a second waveguide with an annular shape positioned adjacent the first waveguide. The first waveguide and the second waveguide each include a core and a cladding. The first waveguide includes a first end, a second end, and a port at each of the first end and the second end for input and output of electromagnetic waves. The core of the second waveguide includes a non-reciprocal member in at least a portion of a cross-section intersecting a direction in which the second waveguide extends.

An isolator according to an embodiment of the present disclosure includes a first waveguide and a second waveguide. The first waveguide includes a first end, a second end, and a port at each of the first end and the second end for input and output of electromagnetic waves. The second waveguide is positioned along the first waveguide. The second waveguide has an annular shape. The first waveguide and the second waveguide are coupled so that, at any operating frequency, a coupling coefficient when electromagnetic waves inputted from the second end propagate towards the first end is greater than a coupling coefficient when electromagnetic waves inputted from the first end propagate towards the second end.

A light source apparatus according to an embodiment of the present disclosure includes an isolator and a light source. The isolator includes a first waveguide with a linear shape and a second waveguide with an annular shape on a substrate including a substrate surface, the first waveguide being positioned along the substrate surface. The first waveguide and the second waveguide each include a core and a cladding. The first waveguide includes a first end, a second end, and a port at each of the first end and the second end for input and output of electromagnetic waves. The core of the second waveguide includes a non-reciprocal member in at least a portion of a cross-section intersecting a direction in which the second waveguide extends. The light source optically connects to the port.

A light source apparatus according to an embodiment of the present disclosure includes an isolator and a light source. The isolator includes a first waveguide and a second waveguide. The first waveguide includes a first end, a second end, and a port at each of the first end and the second end for input and output of electromagnetic waves. The second waveguide is positioned along the first waveguide. The second waveguide has an annular shape. The first waveguide and the second waveguide are coupled so that at any operating frequency, a coupling coefficient when electromagnetic waves inputted from the second end propagate towards the first end is greater than a coupling coefficient when electromagnetic waves inputted from the first end propagate towards the second end. The light source optically connects to the port.

An optical transceiver according to an embodiment of the present disclosure includes an isolator and a light source. The isolator includes a first waveguide with a linear shape and a second waveguide with an annular shape on a substrate including a substrate surface, the first waveguide being positioned along the substrate surface. The first waveguide and the second waveguide each include a core and a cladding. The first waveguide includes a first end, a second end, and a port at each of the first end and the second end for input and output of electromagnetic waves. The core of the second waveguide includes a non-reciprocal member in at least a portion of a cross-section intersecting a direction in which the second waveguide extends. The light source optically connects to the port.

An optical transceiver according to an embodiment of the present disclosure includes an isolator and a light source. The isolator includes a first waveguide and a second waveguide. The first waveguide includes a first end, a second end, and a port at each of the first end and the second end for input and output of electromagnetic waves. The second waveguide is positioned along the first waveguide. The second waveguide has an annular shape. The first waveguide and the second waveguide are coupled so that at any operating frequency, a coupling coefficient when electromagnetic waves inputted from the second end propagate towards the first end is greater than a coupling coefficient when electromagnetic waves inputted from the first end propagate towards the second end. The light source optically connects to the port.

An optical switch according to an embodiment of the present disclosure includes an isolator. The isolator includes a first waveguide with a linear shape and a second waveguide with an annular shape on a substrate including a substrate surface, the first waveguide being positioned along the substrate surface. The first waveguide and the second waveguide each include a core and a cladding. The first waveguide includes a first end, a second end, and a port at each of the first end and the second end for input and output of electromagnetic waves. The core of the second waveguide includes a non-reciprocal member in at least a portion of a cross-section intersecting a direction in which the second waveguide extends.

An optical switch according to an embodiment of the present disclosure includes an isolator. The isolator includes a first waveguide and a second waveguide. The first waveguide includes a first end, a second end, and a port at each of the first end and the second end for input and output of electromagnetic waves. The second waveguide is positioned along the first waveguide. The second waveguide has an annular shape. The first waveguide and the second waveguide are coupled so that at any operating frequency, a coupling coefficient when electromagnetic waves inputted from the second end propagate towards the first end is greater than a coupling coefficient when electromagnetic waves inputted from the first end propagate towards the second end.

An optical amplifier according to an embodiment of the present disclosure includes an isolator. The isolator includes a first waveguide with a linear shape and a second waveguide with an annular shape on a substrate including a substrate surface, the first waveguide being positioned along the substrate surface. The first waveguide and the second waveguide each include a core and a cladding. The first waveguide includes a first end, a second end, and a port at each of the first end and the second end for input and output of electromagnetic waves. The core of the second waveguide includes a non-reciprocal member in at least a portion of a cross-section intersecting a direction in which the second waveguide extends.

A data center according to an embodiment of the present disclosure communicates via a device that includes an isolator. The isolator includes a first waveguide with a linear shape and a second waveguide with an annular shape on a substrate including a substrate surface, the first waveguide being positioned along the substrate surface. The first waveguide and the second waveguide each include a core and a cladding. The first waveguide includes a first end, a second end, and a port at each of the first end and the second end for input and output of electromagnetic waves. The core of the second waveguide includes a non-reciprocal member in at least a portion of a cross-section intersecting a direction in which the second waveguide extends.

BRIEF DESCRIPTION OF THE DRAWINGS

In the accompanying drawings:

FIG. 7 is a cross-sectional diagram illustrating an example configuration of the second waveguide:

DETAILED DESCRIPTION

In an isolator that includes a non-reciprocal phase device, the isolator overall becomes large, as does insertion loss, when non-reciprocity is small in a waveguide that includes a non-reciprocal member. Demand exists for providing sufficient non-reciprocity to a waveguide that includes a non-reciprocal member to reduce insertion loss while achieving a smaller size.

Various embodiments are described below in detail with reference to the drawings.

First Embodiment

Figure 1:
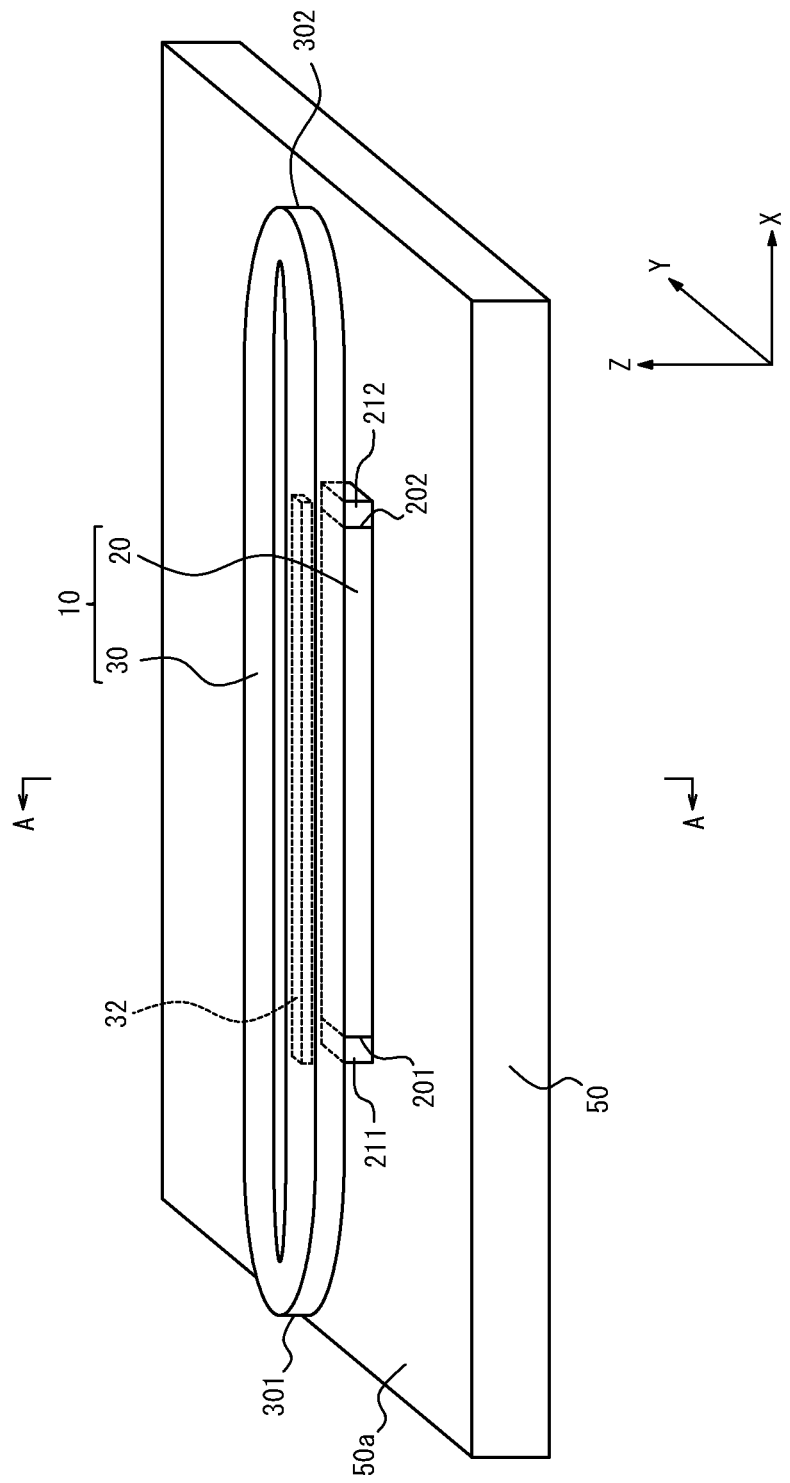
FIG. 1 is a perspective diagram illustrating an example configuration of an isolator according to a first embodiment.

As illustrated in FIG. 1, an isolator 10 according to the first embodiment includes, on a substrate 50 having a substrate surface 50*a*, a linear first waveguide 20 positioned along the substrate surface 50*a* and an annular second waveguide 30.

The substrate 50 may be configured to include a conductor, such as a metal; a semiconductor, such as silicon; glass; resin; or the like. In the first embodiment, two directions that are parallel to the substrate surface 50*a* and perpendicular to each other are designated the x-axis direction and the y-axis direction, and the direction perpendicular to the substrate surface 50*a* is designated the z-axis direction.

On the substrate 50 that includes the substrate surface 50*a*, the first waveguide 20 and the second waveguide 30 are positioned along the substrate surface 50*a* so as to overlap each other as viewed from the substrate surface 50*a*. The first waveguide 20 and the second waveguide 30 are positioned so as not to intersect as viewed from the substrate surface 50*a*. When the first waveguide 20 extends in the x-axis direction, for example, non-intersection as viewed from the substrate surface 50*a* refers to the second waveguide 30 also extending in the x-axis direction. Here, stating that the second waveguide 30 extends in the x-axis direction refers to the annular second waveguide 30 overall extending in the x-axis direction and includes the case of a portion of the annular second waveguide 30 extending in the y-axis direction, for example.

One of the first waveguide 20 and the second waveguide 30 is in contact with the substrate surface 50*a*. In a configuration with the first waveguide 20 in contact with the substrate surface 50*a*, the second waveguide 30 is positioned above the first waveguide 20, i.e. on the positive side in the z-axis direction. In a configuration with the second waveguide 30 in contact with the substrate surface 50a, the first waveguide 20 is positioned above the second waveguide 30, i.e. on the positive side in the z-axis direction. A configuration in which the first waveguide 20 is in contact with the substrate surface 50a is described below.

The first waveguide 20 extends in the x-axis direction. The first waveguide 20 has a first end 201 on the negative side in the x-axis direction and a second end 202 on the positive side in the x-axis direction. The first waveguide 20 has a first port 211 and a second port 212, for input and output of electromagnetic waves, respectively on the first end 201 and the second end 202. The electromagnetic waves that are inputted to the first waveguide 20 from the first port 211 proceed along the x-axis towards the second port 212. The electromagnetic waves that are inputted to the first waveguide 20 from the second port 212 proceed along the x-axis towards the first port 211. The first port 211 and the second port 212 may be formed as the end faces of a core 21 or may be configured as a coupler that connects to an external apparatus and is capable of propagating electromagnetic waves.

The second waveguide 30 extends in the x-axis direction. The second waveguide 30 is annular and is optically connected without interruption. The annular shape is not particularly restricted as long as the shape is optically connected without interruption. By virtue of the second waveguide 30 having an annular shape, the non-reciprocity of a non-reciprocal waveguide in the second waveguide 30 can be increased. The annular shape of the second waveguide 30 can also achieve desired characteristics even when the second waveguide 30 extending in the x-axis direction is short. The insertion loss can thereby be reduced while achieving a smaller size of the isolator 10.

The second waveguide 30 has an end 301 on the negative side in the x-axis direction and an end 302 on the positive side in the x-axis direction. At least a portion of the second waveguide 30 is coupled to the first waveguide 20. An example of one second waveguide 30 is illustrated in FIG. 1, but a plurality of second waveguides 30 may be provided in the x-axis direction.

The first waveguide 20 and the second waveguide 30 are positioned along each other at least at a portion thereof in the direction of extension. The first waveguide 20 and the second waveguide 30 are positioned in parallel to each other at least at a portion thereof in the direction of extension. Two waveguides positioned along each other are also referred to as a parallel waveguide. In a parallel waveguide, electromagnetic waves are inputted to one waveguide can transfer to the other waveguide while propagating. In other words, electromagnetic waves propagating in the first waveguide 20 can transfer to the second waveguide 30. Electromagnetic waves propagating in the second waveguide 30 can transfer to the first waveguide 20.

In a parallel waveguide, the parameter representing the proportion of electromagnetic waves that transfer from one waveguide to the other waveguide is also referred to as the coupling coefficient. When no electromagnetic waves whatsoever transfer from one waveguide to the other waveguide, the coupling coefficient is 0. When all of the electromagnetic waves transfer from one waveguide to the other waveguide, the coupling coefficient is 1. The coupling coefficient can be a value from 0 to 1. The coupling coefficient can be determined based on the shape of each waveguide, the inter-waveguide distance, the length that the waveguides lie along each other, or the like. For example, the coupling coefficient can increase as the shapes of the waveguides are more similar. As for the inter-waveguide distance, the distance between the first waveguide 20 and the second waveguide 30, for example, may be the distance between the core 21 and a core 31. The coupling coefficient can change in accordance with the distance over which the electromagnetic waves propagate within the waveguides. In other words, in a parallel waveguide, the coupling coefficient can differ in accordance with the position along the direction in which the waveguides extend. The local maximum of the coupling coefficient can be determined based on the shape of each waveguide, the inter-waveguide distance, or the like. The local maximum of the coupling coefficient can be a value of 1 or less.

In a parallel waveguide, the coupling coefficient at the starting point of the section where the waveguides lie along each other is 0. The length from the starting point to the position where the coupling coefficient reaches a local maximum is also referred to as the coupling length. When the length over which the waveguides lie along each other is equivalent to the coupling length, the coupling coefficient at the end point of the section where the waveguides lie along each other can be a local maximum. The coupling length can be determined based on the shape of each waveguide, the inter-waveguide distance, or the like.

In the second waveguide 30, the electromagnetic waves that transferred from the first waveguide 20 also propagate in the second waveguide 30 in the same direction as in the first waveguide 20. The electromagnetic waves propagate around the annular shape in the second waveguide 30 and are absorbed due to the loss of the non-reciprocal waveguide.

Figure 2:
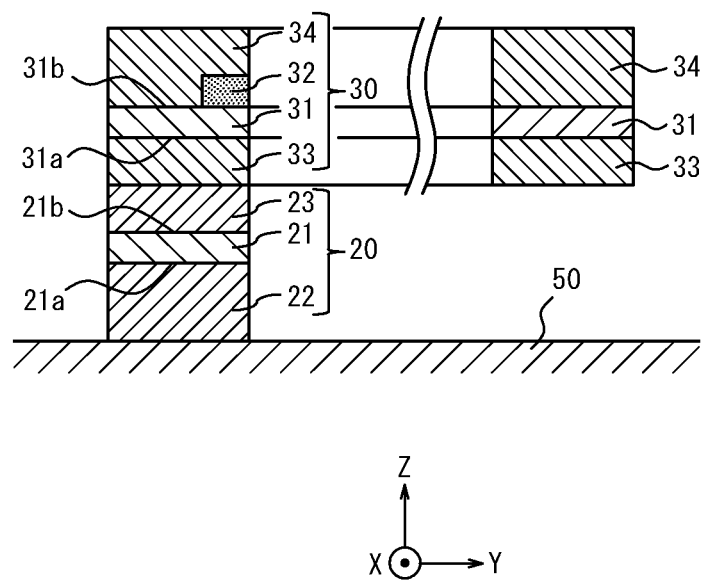
FIG. 2 is a cross-sectional diagram along the A-A line in FIG. 1.

As illustrated in FIG. 2, the first waveguide 20 includes the core 21, a cladding 22, and a cladding 23. The core 21 and the claddings 22, 23 extend in the x-axis direction. The cladding 22 is positioned on the negative side in the z-axis direction, and the cladding 23 is positioned on the positive side in z-axis direction, with respect to the core 21. The cladding 22 is positioned on the side of the substrate 50 as seen from the core 21. The cladding 23 is positioned on the opposite side from the substrate 50 as seen from the core 21. The cladding 23 is thus positioned on the side of the second waveguide 30 as seen from the core 21. The cladding 22, the core 21, and the cladding 23 are layered in this order as seen from the substrate 50. The cladding 22 and the cladding 23 are positioned to sandwich the core 21 along the direction in which the first waveguide 20 and a portion of the second waveguide 30 overlap. In other words, the cladding 22 and the cladding 23 are positioned on either side of the core 21 along the direction in which the first waveguide 20 and a portion of the second waveguide 30 overlap. The core 21 may include a first surface 21a positioned on the side of the substrate 50 and a second surface 21b positioned on the opposite side from the first surface 21a. The cladding 22 may be positioned in contact with the first surface 21a, and the cladding 23 may be positioned in contact with the second surface 21b.

As illustrated in FIG. 2, the second waveguide 30 includes the core 31, a non-reciprocal member 32, a cladding 33, and a cladding 34. The core 31 has an annular shape and extends in the x-axis direction overall. The non-reciprocal member 32 extends in the x-axis direction. The claddings 33, 34 are annular claddings extending in the x-axis direction overall. The non-reciprocal member 32 may be positioned on the positive side in the z-axis direction with respect to the core 31. The non-reciprocal member 32 may be positioned on the negative side in the z-axis direction with respect to the core 31. The non-reciprocal member 32 may be positioned side by side with the core 31 on the negative side or the positive side in the y-axis direction.

As illustrated in FIG. 2, the shapes of the core 31 and the non-reciprocal member 32 as seen in a cross-section intersecting the x-axis are configured not to have point symmetry. The shapes of the core 31 and the non-reciprocal member 32 are further configured not to have line symmetry. The core 31 and the non-reciprocal member 32 are together referred to as an asymmetric core. The asymmetric core is configured to include the core 31 and the non-reciprocal member 32. The asymmetric core may have the non-reciprocal member 32 in at least a portion of a cross-section thereof intersecting the x-axis. The core 31 may be configured to include at least one type of dielectric. The non-reciprocal member 32 may be in contact with a surface of the at least one type of dielectric on the side of the substrate 50 or on the opposite side.

A degree of symmetry can be used as an index representing whether a cross-section of the asymmetric core is close to point symmetry. The degree of symmetry may be represented by the proportion that matches between the cross-sectional shape of the asymmetric core and a cross-sectional shape obtained by rotating the cross-sectional shape of the asymmetric core 180 degrees about a predetermined point. A cross-sectional shape with a high degree of symmetry is close to point symmetry. The asymmetric core may be configured so that the degree of symmetry of a cross-sectional shape thereof is low.

In a cross-section of the asymmetric core, the area of the core 31 may be configured to be greater than the area of the non-reciprocal member 32. This configuration enables the majority of the electromagnetic waves to propagate inside the core 31. Consequently, the loss of electromagnetic waves in the second waveguide 30 can be reduced.

A cross-section of the asymmetrical core may be configured so that the core 31 is positioned in a portion where the intensity of electromagnetic waves propagating through the asymmetric core is the greatest. This configuration enables a high-intensity portion of the electromagnetic waves to propagate inside the core 31. Consequently, the loss of electromagnetic waves in the second waveguide 30 can be reduced.

The cladding 33 is positioned on the negative side in the z-axis direction, and the cladding 34 is positioned on the positive side in z-axis direction, with respect to the asymmetric core. The cladding 33 is positioned on the side of the substrate 50 as seen from the asymmetric core. The cladding 34 is positioned on the opposite side from the substrate 50 as seen from the asymmetric core. The cladding 34 is thus positioned on the side of the second waveguide 30 as seen from the asymmetric core. The cladding 33, the asymmetric core, and the cladding 34 are layered in this order as seen from the substrate 50. The cladding 33 and the cladding 34 are positioned to sandwich the asymmetric core. In other words, the cladding 33 and the cladding 34 are positioned on either side of the asymmetric core along the direction in which the first waveguide 20 and the second waveguide 30 overlap. The core 31 may include a first surface 31a positioned on the side of the substrate 50 and a second surface 31b positioned on the opposite side from the first surface 31a. The cladding 33 may be positioned in contact with the first surface 31a, and the cladding 34 may be positioned in contact with the second surface 31b.

The core 21 and the core 31, along with the cladding 22, the cladding 23, the cladding 33, and the cladding 34 may be configured to include a dielectric. The core 21 and the core 31 are also referred to as dielectric lines. The relative permittivity of the core 21 may be higher than the relative permittivity of the cladding 22 and the cladding 23. The relative permittivity of the core 31 may be higher than the relative permittivity of the cladding 33 and the cladding 34. The cladding 23 and the cladding 33 may be configured from the same dielectric material. The cladding 23 and the cladding 33 may be configured integrally. An integrated configuration of the cladding 23 and the cladding 33 facilitates formation of the isolator 10. The relative permittivity of the core 21 and the core 31, and of the cladding 22, the cladding 23, the cladding 33, and the cladding 34, may be higher than the relative permittivity of air. Leakage of electromagnetic waves from the first waveguide 20 and the second waveguide 30 can be suppressed by the relative permittivity of the core 21 and the core 31, and of the cladding 22, the cladding 23, the cladding 33, and the cladding 34, being higher than the relative permittivity of air. Consequently, the loss due to irradiation of electromagnetic waves from the isolator 10 to the outside can be reduced.

The core 21 and the core 31 may, for example, be formed from silicon (Si). The cladding 22, the cladding 23, the cladding 33, and the cladding 34 may, for example, be formed from quartz glass ($SiO_2$). The relative permittivity of silicon is approximately 12, and the relative permittivity of quartz glass is approximately 2. Silicon can propagate electromagnetic waves that have a near infrared wavelength of approximately 1.2 µm to approximately 6 µm with low loss. When formed from silicon, the core 21 and the core 31 can propagate electromagnetic waves that have a wavelength in the 1.3 µm band or the 1.55 µm band used in optical communication with low loss.

The first waveguide 20 configured to include the core 21, the cladding 22, and the cladding 23 and the second waveguide 30 configured to include the asymmetric core, the cladding 33, and the cladding 34 may satisfy waveguide conditions in a single mode. When the first waveguide 20 and the second waveguide 30 satisfy waveguide conditions in the single mode, the waveform of the signal propagating through the first waveguide 20 and the second waveguide 30 is less likely to collapse. The isolator 10 that combines the first waveguide 20 and the second waveguide 30 that satisfy waveguide conditions in the single mode can be suitable for optical communication.

The relative permittivity of the core 21 or the core 31 may be distributed uniformly along the z-axis direction or may be distributed so as to change along the z-axis direction. For example, the relative permittivity of the core 21 may be distributed so as to be highest in the central portion in the z-axis direction and to decrease towards the cladding 22 and the cladding 23. In this case, the core 21 can propagate electromagnetic waves by the same principle as a graded-index optical fiber.

The electromagnetic waves that are inputted to the core 21 from the first end 201 of the first waveguide 20 via the first port 211 propagate towards the second end 202 in the core 21 of the first waveguide 20 that extends along the x-axis. The direction from the first end 201 towards the second end 202 is also referred to as the first direction.

The electromagnetic waves propagating in the core 21 propagate in the core 31 of the second waveguide 30 in a ratio corresponding to the coupling coefficient based on the distance of propagation in the first direction within the core 21. The coupling coefficient when the electromagnetic waves propagate in the first direction within the core 21 is also referred to as the first coupling coefficient.

The electromagnetic waves that are inputted to the core 21 from the second end 202 of the first waveguide 20 via the second port 212 propagate towards the first end 201 in the core 21 of the first waveguide 20 that extends along the x-axis. The direction from the second end 202 towards the first end 201 is also referred to as the second direction.

The electromagnetic waves propagating in the core 21 propagate in the core 31 of the second waveguide 30 in a ratio corresponding to the coupling coefficient based on the distance of propagation in the second direction within the core 21. The coupling coefficient when the electromagnetic waves propagate in the second direction within the core 21 is also referred to as the second coupling coefficient.

The asymmetric core of the second waveguide 30 may have different propagation characteristics when electromagnetic waves propagate in the first direction and when electromagnetic waves propagate in the second direction. When the propagation characteristics of the asymmetric core differ based on the propagation direction of electromagnetic waves, the first coupling coefficient and the second coupling coefficient can differ from each other. In other words, the non-reciprocal member 32 can cause the first coupling coefficient and the second coupling coefficient to differ from each other.

The non-reciprocal member 32 may be formed from a material that has different propagation characteristics when electromagnetic waves propagate in the first direction and when electromagnetic waves propagate in the second direction. A material that has different propagation characteristics depending on the propagation direction of electromagnetic waves is also referred to as a non-reciprocal material. The non-reciprocal member 32 may, for example, be configured to include a magnetic material such as magnetic garnet, ferrite, iron, or cobalt. The relative permittivity of the non-reciprocal member 32 can be expressed by a tensor as in Expression (1).

$$\varepsilon_r = \begin{bmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{bmatrix} \quad (1)$$

Each element of the tensor may be represented by a complex number. The numbers used as the subscript of each element may correspond to the x-axis, y-axis, and z-axis. A tensor that has complex numbers as elements and represents relative permittivity is also referred to as a complex relative permittivity tensor.

The non-reciprocal member 32 may include a non-reciprocal material at a predetermined concentration. The predetermined concentration may change within the cross-section intersecting the x-axis. The predetermined concentration may change in at least a portion viewed in the polarization direction of electromagnetic waves inputted to the isolator 10.

Figure 3:
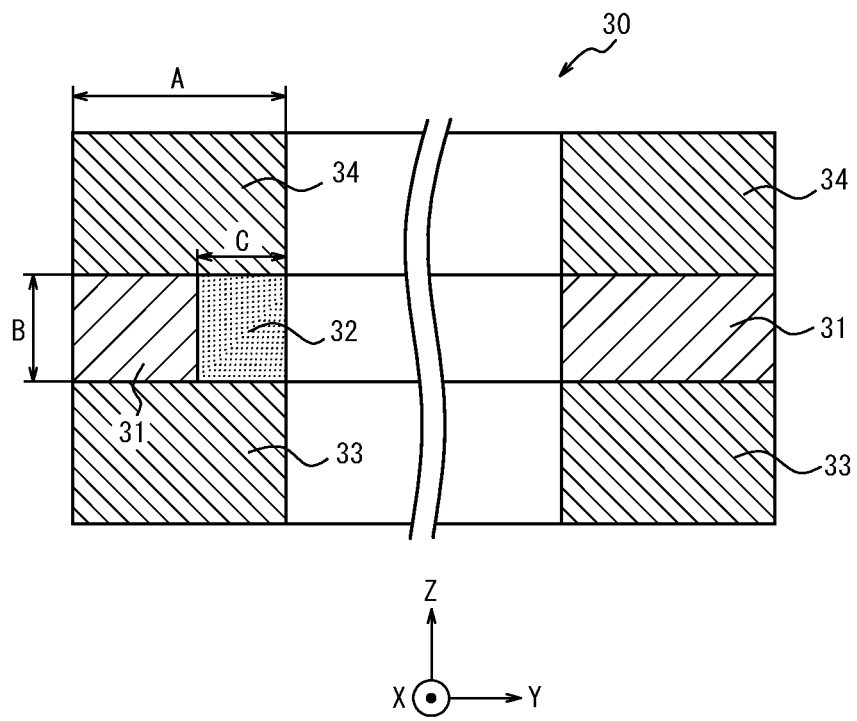
FIG. 3 is a cross-sectional diagram illustrating an example configuration of a second waveguide.

As illustrated in FIG. 3, the non-reciprocal member 32 may be positioned so as to be inserted between the cladding 33 and the cladding 34 in a cross-section intersecting the x-axis. In the annular second waveguide 30, the dimension of the cladding 33 and the cladding 34 in the y-axis direction is represented as A. In the annular second waveguide 30, the dimension of the core 31 and the non-reciprocal member 32 in the z-axis direction is represented as B. In the annular second waveguide 30, the dimension of the non-reciprocal member 32 in the y-axis direction is represented as C. For example, the non-reciprocal member 32 is positioned side by side with the core 31 along the y-axis, towards the positive side in the y-axis direction. The second waveguide 30 extends in the x-axis direction so that the dimension thereof in the x-axis direction becomes a predetermined length. The non-reciprocal member 32 has a relative permittivity expressed by a complex relative permittivity tensor.

In the second waveguide 30, the difference between the phase of electromagnetic waves propagating through the second waveguide 30 in the first direction and the phase of electromagnetic waves propagating through the second waveguide 30 in the second direction is calculated by simulation. The difference between the phase of electromagnetic waves propagating in the first direction and the phase of electromagnetic waves propagating in the second direction is also referred to as the phase difference.

Figure 4:
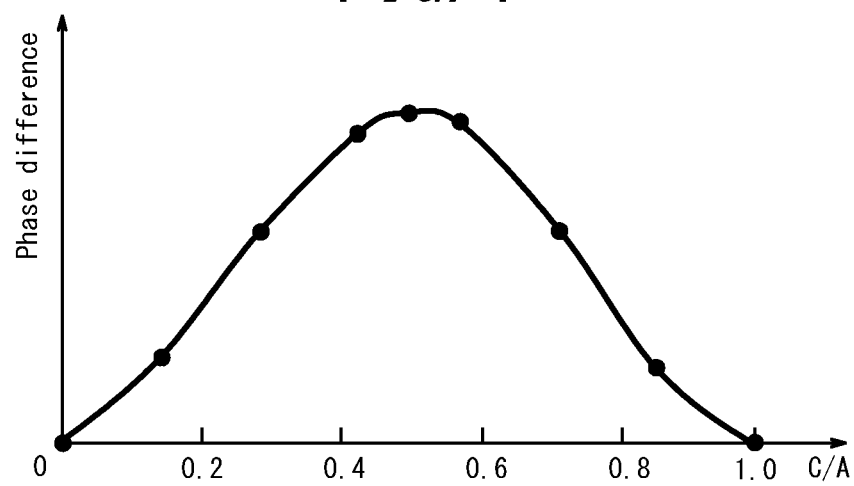
FIG. 4 is a graph illustrating an example of phase difference in the second waveguide.

As illustrated in FIG. 4, the phase difference can change in accordance with the value of C/A. The value of C/A represents the proportion of the asymmetric core, viewed in the z-axis direction, that is occupied by the non-reciprocal member 32. When the value of C/A is near 0.5, the phase difference increases. The phase difference is adjusted by changing the value of C/A. When the phase difference is large, the non-reciprocity of the attenuation amount of electromagnetic waves increases. In other words, as the phase difference increases, the difference between the attenuation amount when electromagnetic waves propagate in the first direction and the attenuation amount when electromagnetic waves propagate in the second direction increases. The second waveguide 30 is configured by adjustment of the value of C/A to have a property such that the attenuation amount of electromagnetic waves differs in accordance with the propagation direction of electromagnetic waves. The property such that the attenuation amount of electromagnetic waves differs in accordance with the propagation direction of electromagnetic waves is also referred to as non-reciprocity. When the value of C/A is near 0.5, the degree of symmetry of the asymmetrical core is lower. In other words, the non-reciprocity of the second waveguide 30 is increased by the degree of symmetry of the asymmetrical core being decreased.

Figure 5:
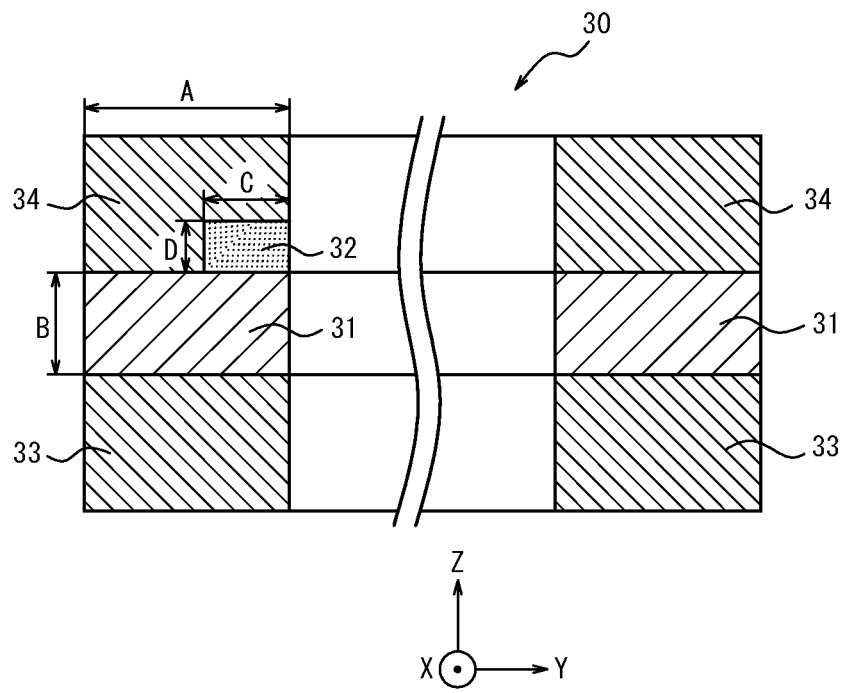
FIG. 5 is a cross-sectional diagram illustrating an example configuration of the second waveguide.

As illustrated in FIG. 5, the non-reciprocal member 32 may be positioned so as to be inserted between the core 31 and the cladding 34 in a cross-section intersecting the x-axis. In the annular second waveguide 30, the dimension of the core 31 in the y-axis direction is represented as A. In the annular second waveguide 30, the dimensions of the non-reciprocal member 32 in the y-axis direction and the z-axis direction are represented as C and D. For example, the non-reciprocal member 32 is positioned farther on the positive side in the z-axis direction than the core 31, towards the positive side in the y-axis direction within the second waveguide 30. The second waveguide 30 extends in the x-axis direction so that the dimension thereof in the x-axis direction becomes a predetermined length. The non-reciprocal member 32 has a relative permittivity expressed by a complex relative permittivity tensor. In the second waveguide 30, the difference between the phase of electromagnetic waves propagating through the second waveguide 30 in the first direction and the phase of electromagnetic waves propagating in the second direction is calculated by simulation.

Figure 6:
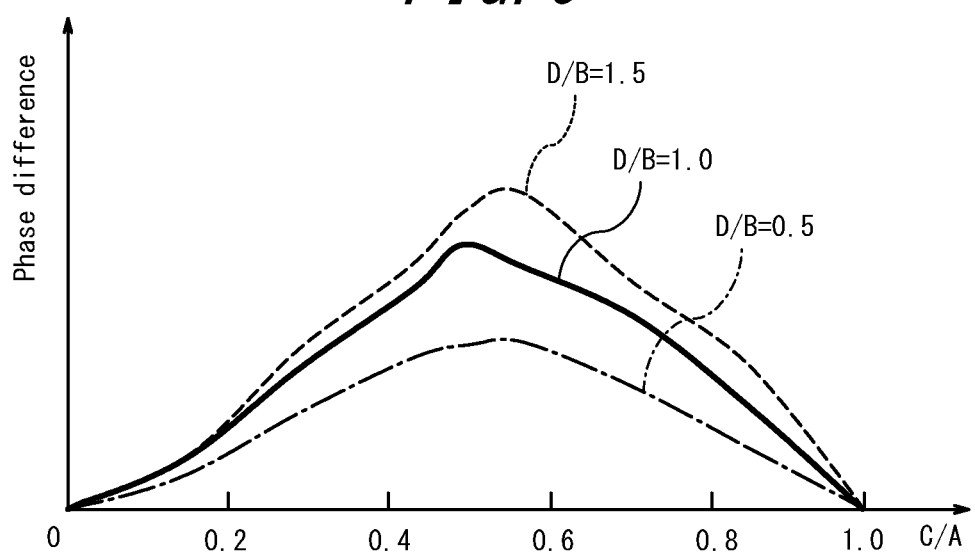
FIG. 6 is a graph illustrating an example of phase difference in the second waveguide.

As illustrated in FIG. 6, the phase difference can change in accordance with the value of C/A. The relationship between the phase difference and the value of C/A can change in accordance with the value of D/B. When the value of C/A is near 0.5, the phase difference increases. The phase difference is adjusted by changing the value of C/A. When the value of D/B is large, the phase difference increases. The phase difference is adjusted by changing the value of D/B. The second waveguide 30 is configured by adjustment of the value of C/A and the value of D/B to have non-reciprocity. When the value of D/B increases within a predetermined range, the degree of symmetry of the asymmetrical core is lower. In other words, the non-reciprocity of the second waveguide 30 is increased by the degree of symmetry of the asymmetrical core being decreased.

As illustrated in FIG. 7, the non-reciprocal member 32 may be positioned so as to be inserted between the core 31 and the cladding 34 in a cross-section intersecting the x-axis. In this case, the asymmetrical core does not have point symmetry. Accordingly, the second waveguide 30 has non-reciprocity.

Figure 8:
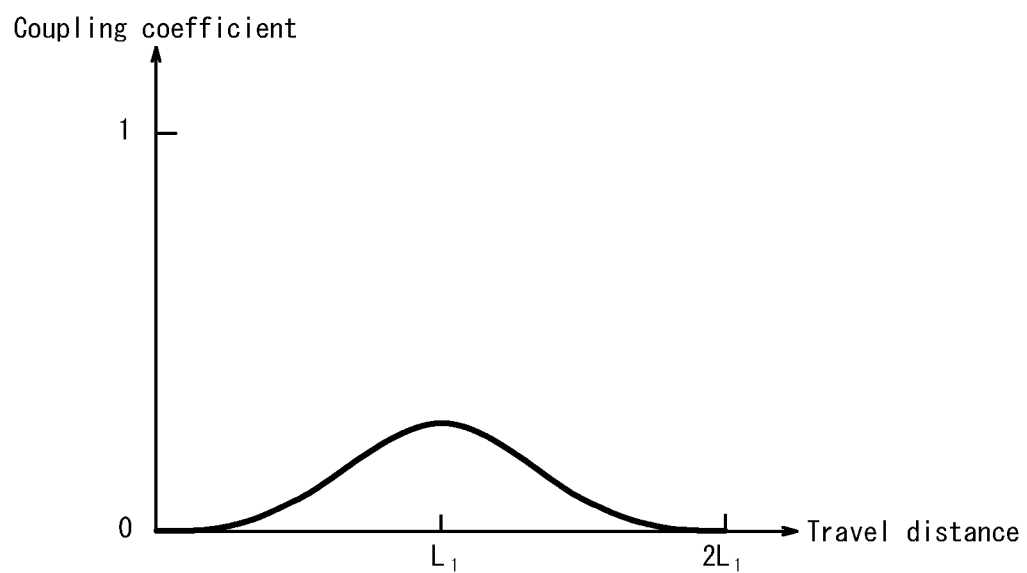
FIG. 8 is a graph illustrating an example of coupling length for electromagnetic waves traveling in a first direction.
Figure 9:
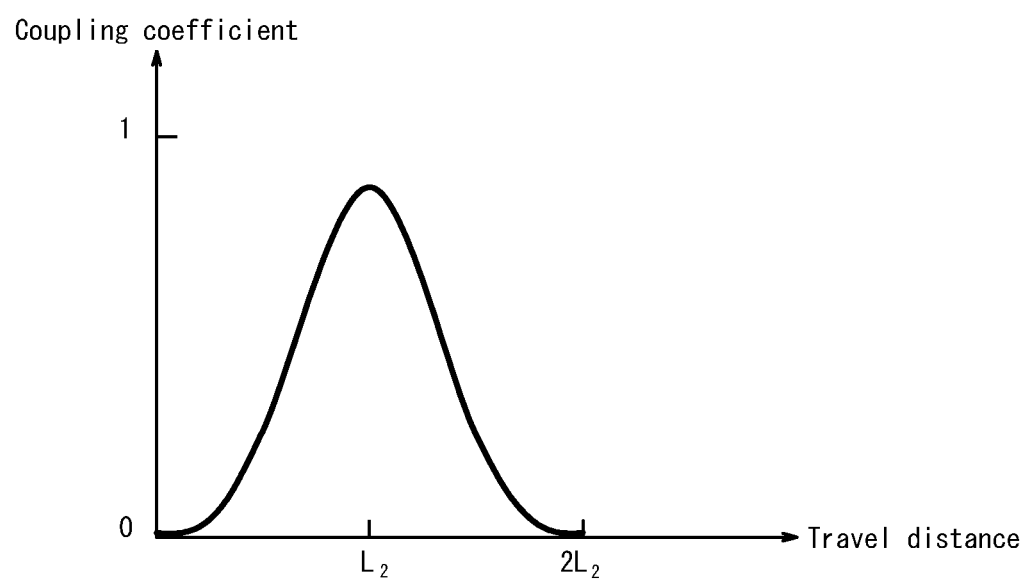
FIG. 9 is a graph illustrating an example of coupling length for electromagnetic waves traveling in a second direction.

When one waveguide in the parallel waveguide has non-reciprocity, the local maximum of the coupling coefficient when electromagnetic waves propagate in the first direction can differ from the local maximum of the coupling coefficient when electromagnetic waves propagate in the second direction. For example, as illustrated in FIG. 8, a configuration can be adopted so that the local maximum of the coupling coefficient for the first waveguide 20 and the second waveguide 30 when electromagnetic waves propagate in the first direction is a value near 0. For example, as illustrated in FIG. 9, a configuration can be adopted so that the local maximum of the coupling coefficient for the first waveguide 20 and the second waveguide 30 when electromagnetic waves propagate in the second direction is a value near 1. By the local maximum of the coupling coefficient differing for each propagation direction of electromagnetic waves, the transmittance of electromagnetic waves can differ for each propagation direction of electromagnetic waves. In FIGS. 8 and 9, the horizontal axis represents the travel distance of electromagnetic waves in the parallel waveguide, and the vertical axis represents the coupling coefficient.

When the second waveguide 30 has non-reciprocity, the coupling coefficient for the first waveguide 20 and the second waveguide 30 differs in accordance with the propagation direction of electromagnetic waves. In other words, when the second waveguide 30 has non-reciprocity, the first coupling coefficient of the isolator 10 differs from the second coupling coefficient. The second coupling coefficient is made larger than the first coupling coefficient by adjustment of the degree of non-reciprocity of the second waveguide 30.

When electromagnetic waves are inputted to the first waveguide 20 from the first port 211 and propagate in the first direction, at least a portion of the electromagnetic waves that transferred to the second waveguide 30, from among the inputted electromagnetic waves, reach the end 302. Among the electromagnetic waves inputted to the first waveguide 20, the proportion of electromagnetic waves that transfers to the second waveguide 30 and reaches the end 302 increases when the first coupling coefficient is large. In this case, among the electromagnetic waves inputted to the first waveguide 20, the proportion of electromagnetic waves that are outputted from the second port 212 decreases. In other words, the ratio of the intensity of electromagnetic waves outputted from the second port 212 to the intensity of the electromagnetic waves inputted to the first port 211 decreases. The ratio of the intensity of electromagnetic waves outputted from the second port 212 to the intensity of the electromagnetic waves inputted to the first port 211 is also referred to as the transmittance of the isolator 10 with respect to electromagnetic waves propagating in the first direction. When the first coupling coefficient is large, the transmittance with respect to electromagnetic waves propagating in the first direction decreases. On the other hand, when the first coupling coefficient is small, the proportion of electromagnetic waves that transfer to the second waveguide 30 decreases. The transmittance with respect to electromagnetic waves propagating in the first direction therefore increases.

The electromagnetic waves that are inputted to the first waveguide 20 from the second port 212 and propagate in the second direction experience the same effect as the effect of the isolator 10 on electromagnetic waves propagating in the first direction. Because of this effect, a portion of the electromagnetic waves propagating in the second direction reaches the end 301 of the second waveguide 30. When the second coupling coefficient is large, the transmittance with respect to electromagnetic waves propagating in the second direction decreases. When the second coupling coefficient is small, the transmittance with respect to electromagnetic waves propagating in the second direction increases.

When the first coupling coefficient and the second coupling coefficient differ, the transmittance with respect to electromagnetic waves propagating in the first direction and the transmittance with respect to electromagnetic waves propagating in the second direction can differ. In other words, by the first coupling coefficient and the second coupling coefficient being different, the isolator 10 can function to facilitate propagation of electromagnetic waves in one direction and impede propagation of electromagnetic waves in the opposite direction. When the second coupling coefficient is larger than the first coupling coefficient, the isolator 10 can function to facilitate propagation of electromagnetic waves in the first direction and impede propagation of electromagnetic waves in the second direction. When the first coupling coefficient is substantially zero and the second coupling coefficient is substantially one, the difference between the transmittance with respect to electromagnetic waves propagating in the first direction and the transmittance with respect to electromagnetic waves propagating in the second direction can be increased. The functionality of the isolator 10 can therefore improve.

When one waveguide in the parallel waveguide has non-reciprocity, the coupling length of the parallel waveguide with respect to electromagnetic waves propagating in the first direction and the coupling length of the parallel waveguide with respect to electromagnetic waves propagating in the second direction can differ. For example, as illustrated in FIG. 8, the coupling length with respect to electromagnetic waves propagating in the first direction in the isolator 10 can be represented as $L_1$. For example, as illustrated in FIG. 9, the coupling length with respect to electromagnetic waves propagating in the second direction in the isolator 10 can be represented as $L_2$. The isolator 10 may be configured so that $L_1$ and $L_2$ differ.

When the length over which the two waveguides lie along each other in a parallel waveguide is equivalent to the coupling length, the coupling coefficient can attain a local maximum. For example, when the length over which two waveguides lie along each other is $L_1$ in a parallel waveguide that has the relationship illustrated in the graph of FIG. 8, the coupling coefficient can attain a local maximum. When the length over which the two waveguides lie along each other is equivalent to two times the coupling length, the coupling coefficient can attain a local minimum. For example, when the length over which two waveguides lie along each other is $2L_1$ in a parallel waveguide that has the relationship illustrated in FIG. 8, the coupling coefficient can attain a local minimum. The relationship illustrated in the graph in FIG. 8 can also repeat in an area where the travel distance of the electromagnetic waves has increased. In other words, the coupling coefficient can attain a local maximum when the length over which two waveguides lie along each other is an odd multiple of $L_1$. The coupling coefficient can attain a local minimum when the length over which two waveguides lie along each other is an even multiple of $L_1$. In a parallel waveguide that has the relationship illustrated in FIG. 9 as well, the coupling coefficient can attain a local maximum and the local minimum respectively when the length over which two waveguides lie along each other is an odd multiple of $L_2$ and an even multiple of $L_2$. $L_1$ and $L_2$ are the shortest possible coupling lengths in the parallel waveguide and are also referred to as the unit coupling length. In other words, the coupling length may be an odd multiple of the unit coupling length.

The first coupling coefficient and the second coupling coefficient can be adjusted by adjustment of the length over which the first waveguide 20 and the second waveguide 30 lie along each other. The length over which the first waveguide 20 and the second waveguide 30 lie along each other may be substantially the same as an odd multiple of the unit coupling length with respect to electromagnetic waves propagating in the second direction. This configuration can increase the second coupling coefficient. The length over which the first waveguide 20 and the second waveguide 30 lie along each other may be substantially the same as an even multiple of the unit coupling length with respect to electromagnetic waves propagating in the first direction. This configuration can decrease the first coupling coefficient. The second coupling coefficient may in this way be made larger than the first coupling coefficient.

Among the electromagnetic waves that are inputted to one port of the isolator 10, the amount of electromagnetic waves that are not outputted from the other port is also referred to as the attenuation amount. When the attenuation amount of electromagnetic waves is large, the transmittance of the electromagnetic waves is low. The attenuation amount of electromagnetic waves that travel in the first direction and in the second direction in the isolator 10 can be calculated by a simulation using the finite element method or the like.

Figure 10:
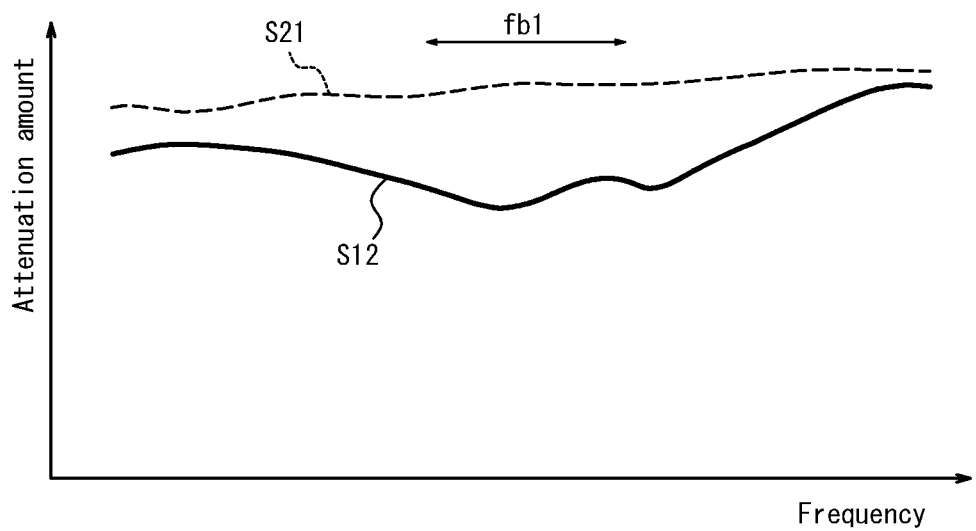
FIG. 10 is a graph illustrating an example of simulation results for transmission characteristics.

As illustrated in FIG. 10, the relationship between the attenuation amount of the electromagnetic waves propagating in the second direction and the frequency of the electromagnetic waves is represented in the graph by the solid curve labeled S12, and the relationship between the attenuation amount of the electromagnetic waves propagating in the first direction and the frequency of the electromagnetic waves is represented in the graph by the dashed curve labeled S21. The horizontal axis of the graph represents the frequency of electromagnetic waves propagating through the first waveguide 20, and the vertical axis represents the attenuation amount of the electromagnetic waves. The attenuation amount of the electromagnetic waves is represented in units of decibels (dB). A curve located higher along the vertical axis represents that the attenuation amount of electromagnetic waves is small. A curve located lower along the vertical axis represents that the attenuation amount of electromagnetic waves is large.

As illustrated in FIG. 10, the attenuation amount, represented by S12, of electromagnetic waves propagating in the second direction can become greater than the attenuation amount, represented by S21, of electromagnetic waves propagating in the first direction in a predetermined frequency band represented by fb1. In this case, the isolator 10 can function to facilitate propagation of electromagnetic waves in a predetermined frequency band from the first port 211 to the second port 212 while impeding propagation of the electromagnetic waves from the second port 212 to the first port 211. The predetermined frequency band in which the isolator 10 can function to vary the attenuation amount for each propagation direction of electromagnetic waves is also referred to as the operating frequency of the isolator 10. The operating frequency of the isolator 10 can be freely determined based on the configuration of the isolator 10. In other words, the second coupling coefficient can be larger than the first coupling coefficient at any operating frequency.

Figure 11:
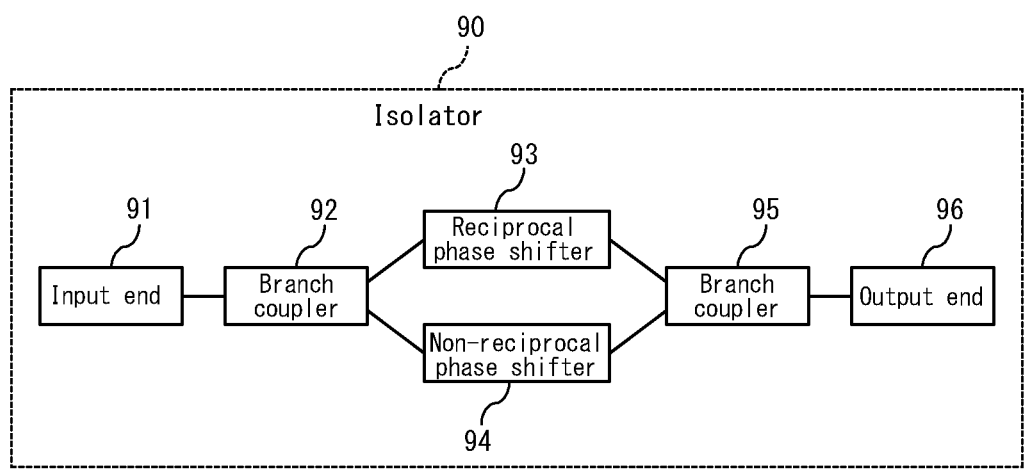
FIG. 11 is a block diagram illustrating an example configuration of an isolator according to a comparative example.

The isolator 10 has the function of making the transmittance with respect to electromagnetic waves propagating in the first direction and the transmittance with respect to electromagnetic waves propagating in the second direction differ. This function can also be implemented by an isolator 90 according to a comparative example illustrated in FIG. 11.

The isolator 90 includes an input end 91, a branch coupler 92, a reciprocal phase shifter 93, a non-reciprocal phase shifter 94, a branch coupler 95, and an output end 96. Electromagnetic waves inputted from the input end 91 branch at the branch coupler 92 and propagate to the reciprocal phase shifter 93 and the non-reciprocal phase shifter 94. The electromagnetic waves undergo a phase shift in the reciprocal phase shifter 93 and the non-reciprocal phase shifter 94, are coupled at the branch coupler 95, and propagate to the output end 96. The reciprocal phase shifter 93 and the non-reciprocal phase shifter 94 can be configured so that the electromagnetic waves inputted from the input end 91 are outputted from the output end 96. On the other hand, electromagnetic waves inputted from the output end 96 branch at the branch coupler 95 and propagate to the reciprocal phase shifter 93 and the non-reciprocal phase shifter 94. The electromagnetic waves undergo a phase shift in the reciprocal phase shifter 93 and the non-reciprocal phase shifter 94, are coupled at the branch coupler 92, and propagate to the input end 91. The reciprocal phase shifter 93 and the non-reciprocal phase shifter 94 can be configured so that the electromagnetic waves inputted from the output end 96 are not outputted from the input end 91.

In the isolator 90 according to the comparative example, the loss of electromagnetic waves is relatively large in the non-reciprocal phase shifter 94 and the branch couplers 92 and 95. On the other hand, electromagnetic waves propagate through the core 31 as a general rule in the isolator 10 according to the first embodiment. By virtue of the second waveguide 30 having an annular shape in the isolator 10 according to the first embodiment, the non-reciprocity of the non-reciprocal waveguide in the second waveguide 30 can be increased. The annular shape of the second waveguide 30 in the isolator 10 according to the first embodiment can also achieve desired characteristics even when the second waveguide 30 extending in the x-axis direction is short. Consequently, the loss of electromagnetic waves in the isolator 10 according to the first embodiment can be smaller than the loss of electromagnetic waves in the isolator 90 according to the comparative example. The isolator 10 according to the first embodiment can, in other words, reduce the loss of electromagnetic waves while being compact. The first waveguide 20 and the second waveguide 30 are also referred to respectively as a reciprocal line and a non-reciprocal line in the isolator 10 according to the first embodiment.

In the isolator 90 according to the comparative example, the non-reciprocal phase shifter 94 and the branch couplers 92 and 95 are mounted to be connected in series, which impedes a reduction in size. On the other hand, the first waveguide 20 and the second waveguide 30 overlap in the isolator 10 according to the first embodiment, making it easier to reduce the size of the isolator 10 on the substrate 50. Consequently, the isolator 10 according to the first embodiment can be integrated and implemented on the substrate 50. The isolator 10 according to the first embodiment can, in other words, function to facilitate transmission of electromagnetic waves in one direction and impede transmission in the opposite direction by virtue of having an integrated configuration.

Figure 12:
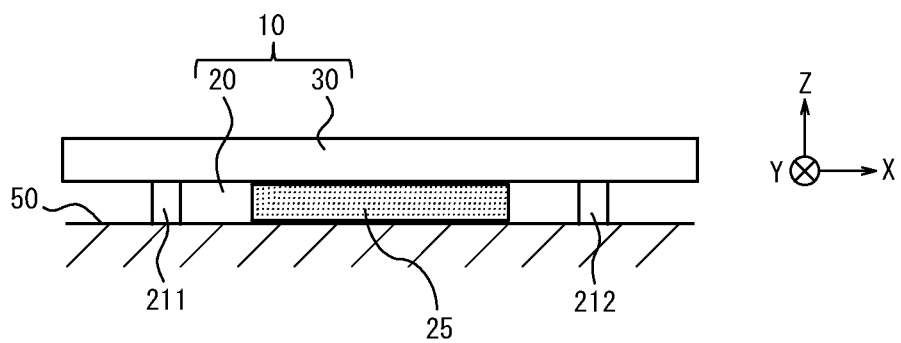
FIG. 12 is a side view illustrating an example configuration of an isolator that has a matching adjustment circuit in a waveguide.
Figure 13:
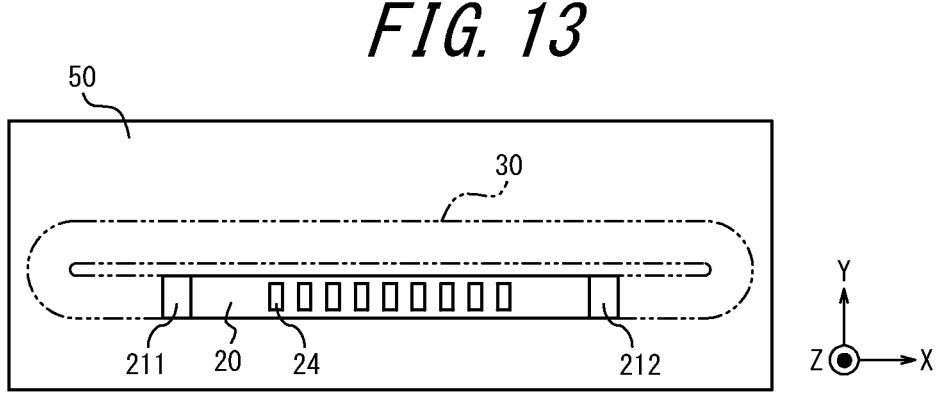
FIG. 13 is a plan view illustrating an example configuration of an isolator that has a matching adjustment circuit in a waveguide.

As illustrated in FIG. 12, the first waveguide 20 may include a matching adjustment circuit 25. The matching adjustment circuit 25 can adjust the propagation characteristics for each frequency of electromagnetic waves propagating in the first waveguide 20. The matching adjustment circuit 25 may, for example, be provided as a structure in which the core 21 has a plurality of holes 24, as illustrated in FIG. 13. The second waveguide 30 is indicated in FIG. 13 by a virtual dashed double-dotted line. The holes 24 may pass through the core 21 in the y-axis direction. The holes 24 may pass through from the first surface 21a to the second surface 21b of the core 21. The holes 24 may pass through the claddings 22, 23 in the y-axis direction. The holes 24 may be side by side in the x-axis direction. In other words, the holes 24 may be side by side in the direction in which the core 21 extends. The number of holes 24 is not limited to 9. The shape of the holes 24 as seen from the z-axis direction is not limited to a rectangle and may be any of various shapes, such as a circle or a polygon.

The holes 24 may be arranged periodically in the x-axis direction. When the core 21 includes holes 24 arranged periodically in the x-axis direction, the first waveguide 20 including the core 21 can form a Bragg diffraction grating. When electromagnetic waves are inputted to the first waveguide 20 from the first port 211, the portion of the inputted electromagnetic waves that has a wavelength satisfying the Bragg reflection condition can be reflected and return to the first port 211. On the other hand, the electromagnetic waves having other wavelengths can propagate towards the second port 212. In other words, the first waveguide 20 that includes the holes 24 can function as a filter for electromagnetic waves having a predetermined wavelength.

Figure 14:
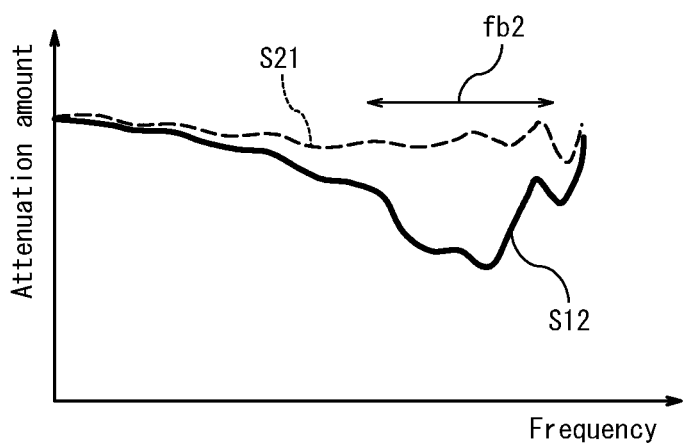
FIG. 14 is a graph illustrating an example of simulation results for transmission characteristics.

When the first waveguide 20 includes the matching adjustment circuit 25, the attenuation amount, represented by S21, of electromagnetic waves propagating in the first direction can become greater than the attenuation amount, represented by S12, of electromagnetic waves propagating in the second direction in a predetermined frequency band represented by fb2, as illustrated in FIG. 14, for example. Here, fb2 may be a different frequency band than the frequency band indicated by fb1 in FIG. 10. By adjustment of the configuration of the matching adjustment circuit 25, fb2 can be set to a higher frequency band or a lower frequency band than the frequency band indicated by fb1. A description of the matter common to both the graph in FIG. 14 and the graph in FIG. 10 is omitted.

The non-reciprocal member 32 may be configured to have non-reciprocity when a magnetic field in a predetermined direction is applied. The non-reciprocal member 32 may be configured to have non-reciprocity when a magnetic field having a component in the z-axis direction is applied. The predetermined direction is not limited to the z-axis direction and may be any of various directions. The predetermined direction may be determined based on the cross-sectional shape of the asymmetric core or the degree of symmetry. The non-reciprocal member 32 may be configured to have non-reciprocity of a different magnitude in accordance with a change in the intensity or orientation of the magnetic field. This configuration of the isolator 10 enables control of whether the non-reciprocal member 32 has non-reciprocity, or control of the degree of non-reciprocity of the non-reciprocal member 32.

Figure 15:
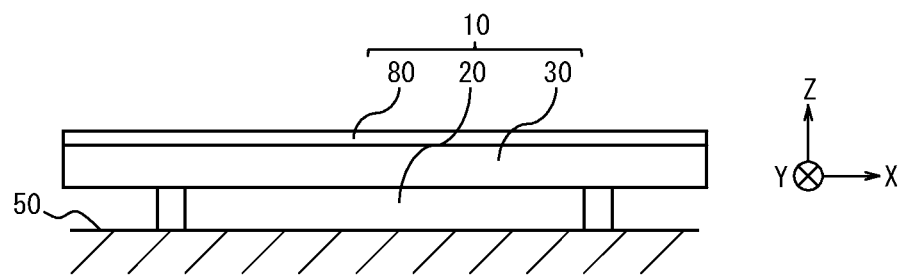
FIG. 15 is a side view illustrating an example configuration of an isolator that includes a magnetic field applicator.

As illustrated in FIG. 15, the isolator 10 may further include a magnetic field applicator 80 configured to apply a magnetic field. The magnetic field applicator 80 may be positioned on the positive side in the z-axis direction with respect to the second waveguide 30. The magnetic field applicator 80 may be positioned on the substrate 50 side of the second waveguide 30, with the first waveguide 20 therebetween. The magnetic field applicator 80 may be positioned in a different manner than in the example illustrated in FIG. 15. The magnetic field applicator 80 may be a permanent magnet, such as a ferrite magnet or a neodymium magnet. The magnetic field applicator 80 may be an electromagnet.

The propagation mode of electromagnetic waves in a parallel waveguide can include an even mode and an odd mode. The even mode is a mode such that the electric field of propagating electromagnetic waves faces the same direction in the waveguides forming the parallel waveguide. The odd mode is a mode such that the electric field of propagating electromagnetic waves faces opposite directions in the waveguides forming the parallel waveguide. The electromagnetic waves can propagate in the parallel waveguide based on the effective refractive index of the parallel waveguide. The effective refractive index of the parallel waveguide can be determined based on the shape of each waveguide forming the parallel waveguide, the relative permittivity of the material forming the waveguides, the propagation mode of electromagnetic waves, or the like. The effective refractive index of the parallel waveguide when the electromagnetic waves propagate in the even mode is also referred to as the even mode refractive index. The effective refractive index of the parallel waveguide when the electromagnetic waves propagate in the odd mode is also referred to as the odd mode refractive index. The even mode refractive index is represented as $n_{even}$, and the odd mode refractive index is represented as $n_{odd}$. The coupling length in the parallel waveguide can be represented by Expression (2) below.

$$L = \frac{m\lambda_0}{2 \cdot |n_{even} - n_{odd}|} \quad (2)$$

(where L is the coupling length, m is an odd number, and $\lambda_0$ is the wavelength in a vacuum)

Figure 16:
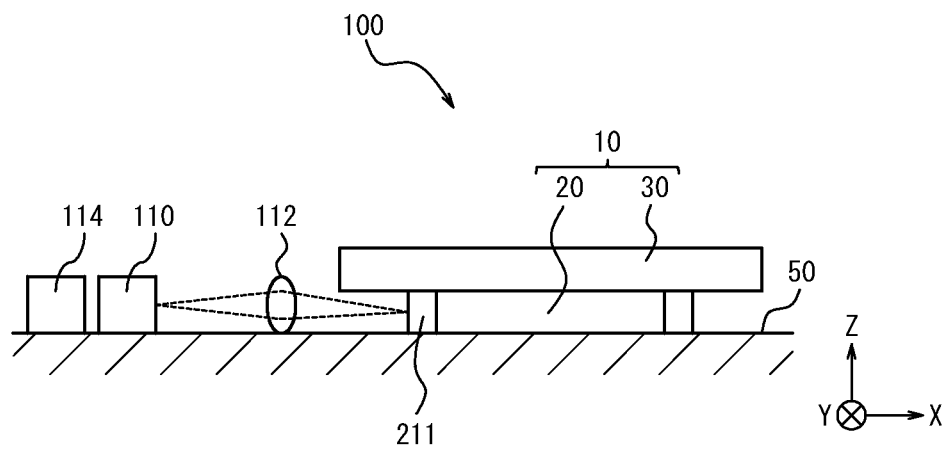
FIG. 16 is a side view illustrating an example configuration of a light source apparatus.

The isolator 10 can be used in combination with a configuration for inputting light. In this case, the isolator 10 is also referred to as an optical isolator. As illustrated in FIG. 16, a light source apparatus 100 includes the isolator 10, a light source 110, a lens 112, and a power supply 114 that supplies power to the light source 110. The light source 110 may, for example, be a semiconductor laser such as a Laser Diode (LD) or a Vertical Cavity Surface Emitting LASER (VCSEL). The light source 110 may be formed on the substrate 50.

The lens 112 collects the light outputted from the light source 110 on the first port 211 of the first waveguide 20 in the isolator 10. The shape of the lens 112 is not particularly restricted. A small ball lens, a biconvex lens, a plano-convex lens, or the like can be adopted as the lens 112. The lens 112 may be configured to include a material that is light transmitting with respect to the wavelength of propagating light.

The light source 110 can be considered optically connected to the first port 211 via the lens 112. The positional relationships between the light source 110, the lens 112, and the first port 211 may be fixed to prevent misalignment. The light source 110, the lens 112, and the first port 211 may be integrated on the substrate 50. The light source 110 may input linearly polarized light whose polarization direction is the y-axis direction to the first port 211. The light source apparatus 100 need not include the lens 112. When not including the lens 112, the light source apparatus 100 may input light emitted from the light source 110 directly to the first port 211.

The method for inputting light from the light source 110 to the first port 211 is not limited to a method for inputting light of the light source 110 directly or via the lens 112. The light source 110 may be coupled to the first port 211 via an optical fiber. The method for inputting light that propagates through the optical fiber into the first port 211 may be any of various methods, such as a method for connecting free space via a lens or the like, a method for directly abutting the exit face of the optical fiber against the first port 211, or a method for using a connection waveguide 120 (see FIG. 17).

By including the light source 110 and the isolator 10, the light source apparatus 100 can output light, outputted from the light source 110, through the isolator 10 in the first direction. On the other hand, the isolator 10 in the light source apparatus 100 can impede propagation of light returning in the second direction, impeding the return of light to the light source 110 side. Light can therefore be outputted efficiently.

In the light source apparatus 100, the first waveguide 20 may be configured to be in contact with the substrate surface 50a. In other words, the first waveguide 20 may be positioned on the side closer to the substrate surface 50a than the second waveguide 30. This configuration enables the light source 110 integrated on the substrate 50 to easily be connected optically to the first port 211.

Figure 17:
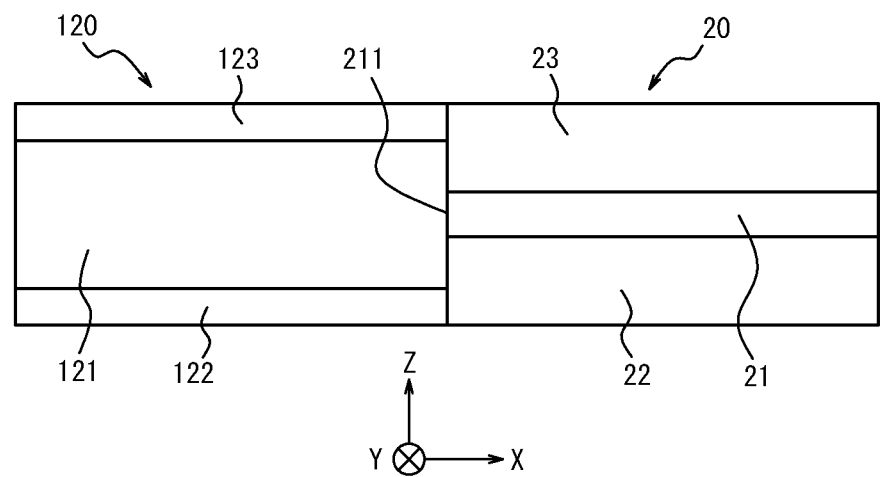
FIG. 17 is a cross-sectional diagram illustrating an example of connection between a connection waveguide and the first waveguide.

As illustrated in FIG. 17, the connection waveguide 120 may include a core 121, a cladding 122, and a cladding 123. The relative permittivity of the core 121 may be substantially equal to the relative permittivity of the core 21 of the first waveguide 20. The core 121 may be formed from the same material as the core 21. The relative permittivity of the cladding 122 and the cladding 123 may be set lower than the relative permittivity of the core 121. The relative permittivity of the cladding 122 and the cladding 123 may be substantially equal to the relative permittivity of the cladding 22 and the cladding 23 of the first waveguide 20. The cladding 122 and the cladding 123 may be formed from the same material as the cladding 22 and the cladding 23. The end face of the core 121 on the side in the positive direction of the x-axis is in contact with the first port 211 positioned on the end face of the core 21 on the side in the negative direction of the x-axis. The thickness of the core 121 in the z-axis direction may be greater than the thickness of the core 21 of the first waveguide 20 in the z-axis direction. The thickness of the core 121 in the z-axis direction may be substantially equal to the thickness of the core 21 of the first waveguide 20 in the z-axis direction.

The light inputted to the side of the core 121 in the negative direction of the x-axis may be linearly polarized light whose polarization direction is the y-axis direction. In other words, the polarization direction of light inputted to the core 121 from the side in the negative direction of the x-axis may be parallel to the substrate surface 50a. When the light source 110 integrated on the substrate 50 is a semiconductor laser, the polarization direction of light emitted by the semiconductor laser is parallel to the substrate surface 50a. A semiconductor laser is easy to integrate on the substrate 50. This configuration can therefore facilitate formation of the light source apparatus 100.

At the connecting portion between the core 121 and the core 21, the width of the core 121 in the y-axis direction may be substantially equal to the width of the core 21 in the v-axis direction. When the width of the core 121 and the core 21 in the y-axis direction changes discontinuously at the connecting portion between the core 121 and the core 21, light whose polarization direction is the y-axis direction tends to be irradiated at the connecting portion. The loss due to irradiation can be reduced at the connecting portion between the core 121 the core 21 by the width of the core 121 and the core 21 in the y-axis direction being made substantially equal.

Figure 18:
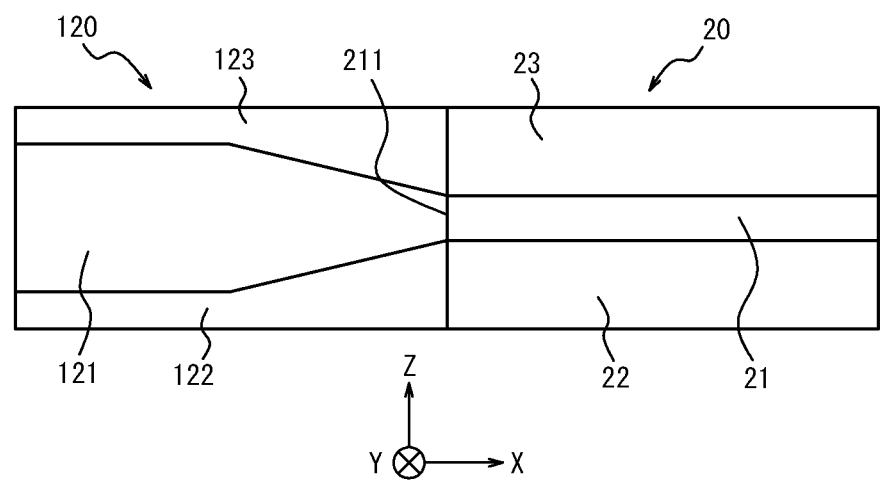
FIG. 18 is a cross-sectional diagram illustrating an example of connection between a connection waveguide and the first waveguide.

As illustrated in FIG. 18, the core 121 of the connection waveguide 120 may be tapered to become thinner in the z-axis direction as it approaches the portion connected to the core 21 of the first waveguide 20. When light whose polarization direction is the y-axis direction is inputted to the connection waveguide 120, this configuration enables the inputted light to be matched to the propagation mode of light in the core 21. Non-conformance between propagation modes of light is thus less likely when light enters the core 21 from the core 121. Consequently, the occurrence of loss when light enters the core 21 from the core 121 can be reduced.

Second Embodiment

An isolator 10A according to a second embodiment is described next.

The differences between the isolator 10 according to the first embodiment and the isolator 10A according to the second embodiment are as follows. In the isolator 10 according to the first embodiment, the first waveguide 20 and the second waveguide 30 are positioned along the z-axis direction. In the isolator 10A according to the second embodiment, the first waveguide 20 and the second waveguide 30 are instead positioned along the v-axis direction. Since the remaining configuration is the same as that of the isolator 10 according to the first embodiment, a redundant explanation is omitted.

Figure 19:
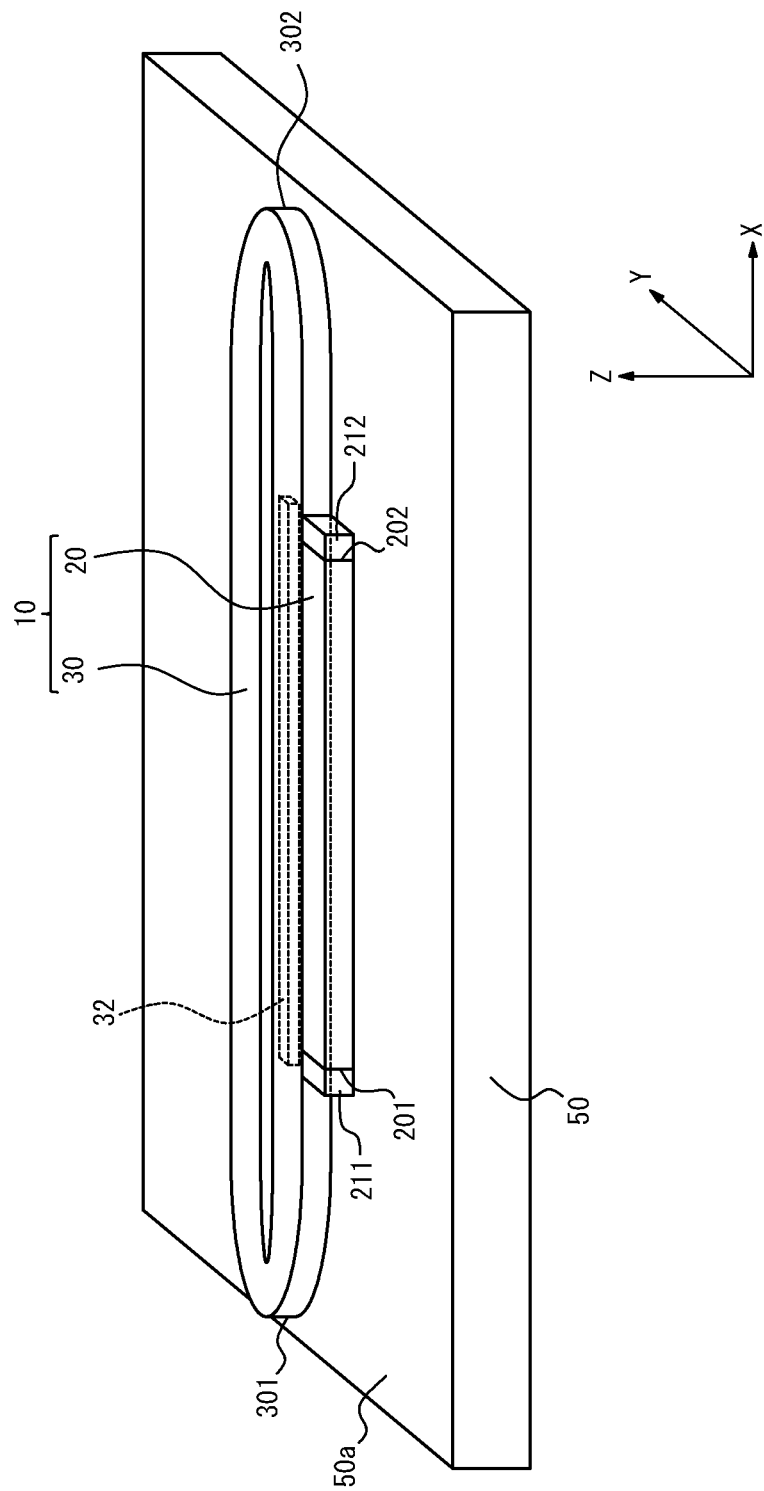
FIG. 19 is a perspective diagram illustrating an example configuration of an isolator according to a second embodiment.

As illustrated in FIG. 19, an isolator 10A according to the second embodiment includes, on a substrate 50 having a substrate surface 50a, a linear first waveguide 20 positioned along the substrate surface 50a and an annular second waveguide 30.

On the substrate 50 that includes the substrate surface 50a, the first waveguide 20 and the second waveguide 30 are positioned along the substrate surface 50a so as to be side by side in parallel with the substrate surface 50a.

The first waveguide 20 extends in the x-axis direction and is in contact with the substrate surface 50a. The first waveguide 20 has a first end 201 on the negative side in the x-axis direction and a second end 202 on the positive side in the x-axis direction. The first waveguide 20 has a first port 211 and a second port 212, for input and output of electromagnetic waves, respectively on the first end 201 and the second end 202. The electromagnetic waves that are inputted to the first waveguide 20 from the first port 211 proceed along the x-axis towards the second port 212. The electromagnetic waves that are inputted to the first waveguide 20 from the second port 212 proceed along the x-axis towards the first port 211. The first port 211 and the second port 212 may be formed as the end faces of a core 21 or may be configured as a coupler that connects to an external apparatus and is capable of propagating electromagnetic waves.

The second waveguide 30 extends in the x-axis direction and is in contact with the substrate surface 50a. The second waveguide 30 is annular and is optically connected without interruption. The annular shape is not particularly restricted as long as the shape is optically connected without interruption. By virtue of the second waveguide 30 having an annular shape, the non-reciprocity of a non-reciprocal waveguide in the second waveguide 30 can be increased. The annular shape of the second waveguide 30 can also achieve desired characteristics even when the second waveguide 30 extending in the x-axis direction is short. The insertion loss can thereby be reduced while achieving a smaller size of the isolator 10A.

The second waveguide 30 has an end 301 on the negative side in the x-axis direction and an end 302 on the positive side in the x-axis direction. An example of one second waveguide 30 is illustrated in FIG. 19, but this example is not limiting, and two or more second waveguides 30 may instead be provided.

By virtue of the second waveguide 30 having an annular shape in the isolator 10A according to the second embodiment, the non-reciprocity of the non-reciprocal waveguide in the second waveguide 30 can be increased. The annular shape of the second waveguide 30 in the isolator 10A according to the second embodiment can also achieve desired characteristics even when the second waveguide 30 extending in the x-axis direction is short. Consequently, the loss of electromagnetic waves in the isolator 10A according to the second embodiment can be smaller than the loss of electromagnetic waves in the isolator 90 according to the comparative example. The isolator 10A according to the second embodiment can, in other words, reduce the loss of electromagnetic waves while being compact.

Positioning the first waveguide 20 and the second waveguide 30 so as to overlap each other as viewed from the substrate surface 50a, as in the isolator 10 according to the first embodiment, has the advantage that the size of each waveguide is easy to adjust in the z-axis direction during production of the isolator 10. On the other hand, positioning the first waveguide 20 and the second waveguide 30 so as to be side by side in parallel with the substrate surface 50a, as in the isolator 10A according to the second embodiment, has the advantage that the production process of the isolator 10A becomes relatively simple.

The isolator 10, the isolator 10A, and the light source apparatus 100 according to the present disclosure may be mounted in an optical transceiver that has a modulation function. The isolator 10 and the isolator 10A according to the present disclosure may be used in an optical switch or an optical amplifier. The isolator 10 and the isolator 10A according to the present disclosure may be used in a device. A device including the isolator 10 or the isolator 10A according to the present disclosure may be used for communication in a data center.

Although embodiments of the present disclosure have been described through drawings and examples, it is to be noted that various changes and modifications will be apparent to those skilled in the art on the basis of the present disclosure. Therefore, such changes and modifications are to be understood as included within the scope of the present disclosure. For example, the functions or the like included in the various components or steps may be reordered in any logically consistent way. Furthermore, components or steps may be combined into one or divided. While embodiments of the present disclosure have been described focusing on apparatuses, the present disclosure may also be embodied as a method that includes steps performed by the components of an apparatus. The present disclosure may also be embodied as a method executed by a processor provided in an apparatus, as a program, or as a recording medium having a program recorded thereon. Such embodiments are also to be understood as falling within the scope of the present disclosure.

The references to "first", "second", and the like in the present disclosure are identifiers for distinguishing between the corresponding elements. The numbers attached to elements distinguished by references to "first", "second", and the like in the present disclosure may be switched. For example, the identifiers "first" and "second" of the first port and the second port may be switched. Identifiers are switched simultaneously, and the elements are still distinguished between after identifiers are switched. The identifiers may be removed. Elements from which the identifiers are removed are distinguished by their reference sign. Identifiers in the present disclosure, such as "first" and "second", may not be used in isolation as an interpretation of the order of elements or as the basis for the existence of the identifier with a lower number.

In the present disclosure, the x-axis, y-axis, and z-axis are provided for the sake of explanation and may be interchanged. Configurations according to the present disclosure have been described using an orthogonal coordinate system constituted by the x-axis, y-axis, and z-axis. The positional relationships between elements according to the present disclosure are not limited to orthogonal relationships.

The invention claimed is:

1. An isolator comprising:
a first waveguide with a linear shape positioned on a substrate surface of a substrate, and a second waveguide with an annular shape positioned adjacent the first waveguide, wherein
the first waveguide and the second waveguide each include a core and a cladding,
the first waveguide and the second waveguide each are positioned along each other at least at a portion thereof in a direction of extension as a parallel waveguide,
the second waveguide includes a straight part, at least a portion of the straight part being parallel with the first waveguide as the parallel waveguide,
the first waveguide includes a first end, a second end, and a port at each of the first end and the second end for input and output of electromagnetic waves, and
the core of the second waveguide includes, in at least a portion of parts being the parallel waveguide, a non-reciprocal member in at least a portion of a cross-section intersecting a direction in which the second waveguide extends.

2. The isolator of claim 1, wherein the second waveguide is optically connected without interruption.

3. The isolator of claim 1, wherein the first waveguide and the second waveguide are positioned side by side in parallel on the substrate surface.

4. The isolator of claim 1, wherein the first waveguide and the second waveguide are positioned to overlap each other in a plan view of the substrate surface.

5. The isolator of claim 1, wherein a polarization direction of electromagnetic waves inputted to the port at the first end is parallel to the substrate surface.

6. The isolator of claim 1, wherein
the non-reciprocal member includes a non-reciprocal material at a predetermined concentration, and
the predetermined concentration changes in at least a portion of the non-reciprocal member as viewed from a direction along a polarization direction of electromagnetic waves inputted to the port at the first end.

7. The isolator of claim 1, wherein the electromagnetic waves inputted to the first end and the second end are propagated in a single mode.

8. The isolator of claim 1, wherein a length of the second waveguide is an odd multiple of a coupling length of the first waveguide and the second waveguide with respect to electromagnetic waves propagating from the second end to the first end.

9. The isolator of claim 1, wherein L representing a length of the second waveguide is calculated by $$L = m\lambda_0 / 2|(n_{even} - n_{odd})|$$

where $n_{even}$ represents an even mode refractive index and $n_{odd}$ represents an odd mode refractive index with respect to electromagnetic waves propagating from the second end to the first end in a coupling between the first waveguide and the second waveguide, m is an odd number, and $\lambda_0$ is a wavelength in a vacuum.

10. The isolator of claim 1, wherein a length of the second waveguide is an even multiple of a coupling length of the first waveguide and the second waveguide with respect to electromagnetic waves propagating from the first end to the second end.

11. The isolator of claim 1, wherein
the core of the first waveguide includes a first surface positioned on a substrate side of the first waveguide, a second surface positioned on an opposite side from the first surface, and a plurality of holes passing through from the first surface to the second surface, and
the plurality of holes are side by side in a direction in which the core of the first waveguide extends.

12. The isolator of claim 1, further comprising
a connection waveguide configured to connect to the port, wherein
a relative permittivity of a core of the connection waveguide is substantially equal to a relative permittivity of at least a portion of the core of the first waveguide, and
a width of the core of the connection waveguide as viewed from a direction that lies along the substrate surface and intersects a direction in which the first waveguide extends is substantially equal to a width of the core of the first waveguide.

13. An isolator comprising:
a first waveguide including a first end, a second end, and a port at each of the first end and the second end for input and output of electromagnetic waves; and
a second waveguide with an annular shape positioned along the first waveguide, wherein
the first waveguide and the second waveguide each are positioned along each other at least at a portion thereof in a direction of extension as a parallel waveguide,
the second waveguide includes a straight part, at least a portion of the straight part being parallel with the first waveguide as the parallel waveguide,
the first waveguide and the second waveguide are coupled so that, at any operating frequency of the isolator, a coupling coefficient when electromagnetic waves inputted from the second end propagate towards the first end is greater than a coupling coefficient when electromagnetic waves inputted from the first end propagate towards the second end, and
a core of the second waveguide includes, in at least a portion of parts being the parallel waveguide, a non-reciprocal member in at least a portion of a cross-section intersecting a direction in which the second waveguide extends.

14. The isolator of claim 13, wherein a length over which the first waveguide and the second waveguide lie along each other is substantially equal to a coupling length of the first waveguide and the second waveguide with respect to electromagnetic waves propagating from the second end towards the first end.

15. The isolator of claim 13, wherein the first waveguide includes a matching adjustment circuit at a portion of the first waveguide where the first waveguide couples with the second waveguide.

16. A light source apparatus comprising:
the isolator of claim 1; and
a light source, wherein
the light source optically connects to the port.

17. An optical transceiver comprising:
a light source apparatus including
the isolator of claim 1; and
a light source configured to connect optically to the port; and
a light modulation function that modulates the light source.

18. An optical switch comprising the isolator of claim 1.

19. An optical amplifier comprising the isolator of claim 1.

20. A data center configured to communicate via a device comprising the isolator of claim 1.

* * * * *